E. F. BERRY.
COUPLING.
APPLICATION FILED OCT. 5, 1916.

1,233,171.

Patented July 10, 1917.
2 SHEETS—SHEET 1.

Witness:
Jas. E. Hutchinson.

Inventor:
Edward F. Berry,
By Bueno Means
Attorneys

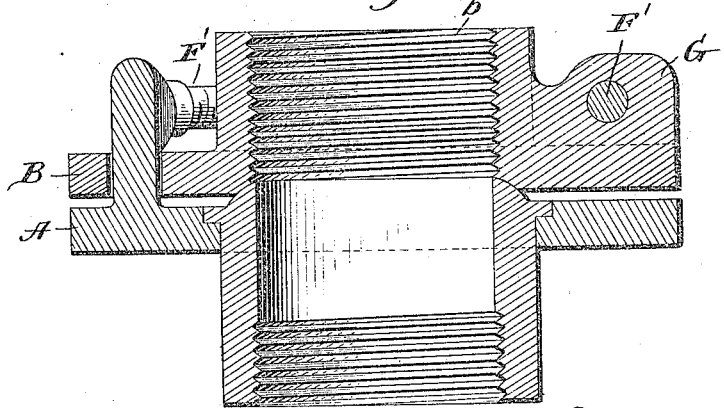
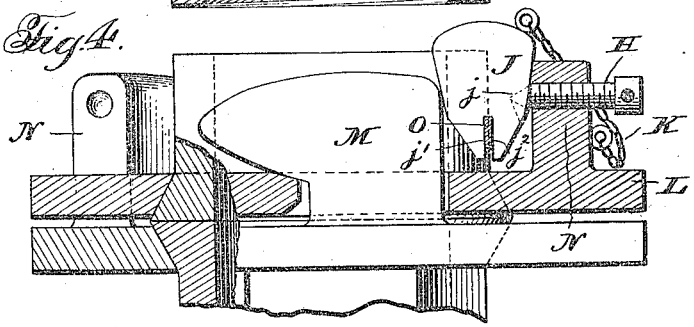
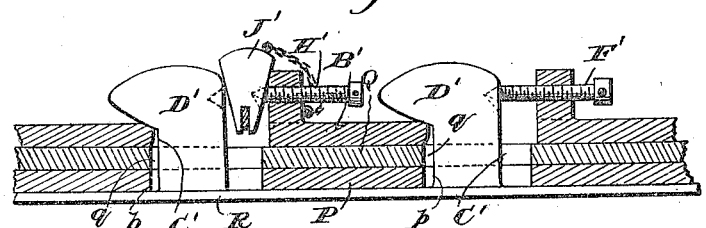
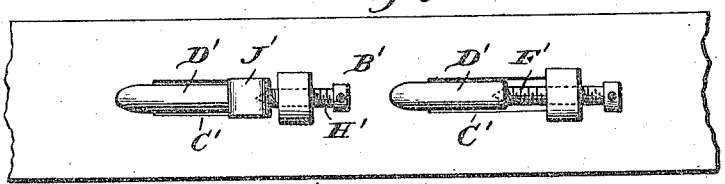

UNITED STATES PATENT OFFICE.

EDWARD F. BERRY, OF NEW ORLEANS, LOUISIANA.

COUPLING.

1,233,171.   Specification of Letters Patent.   Patented July 10, 1917.

Application filed October 5, 1916. Serial No. 123,938.

*To all whom it may concern:*

Be it known that I, EDWARD F. BERRY, citizen of the United States, residing at New Orleans, in the parish of Orleans and State of Louisiana, have invented certain new and useful Improvements in Coupling, of which the following is a specification, reference being had therein to the accompanying drawing.

This invention relates to improvements in devices designed to expeditiously and securely couple separate members together, and is useful in many mechanical fields.

The primary object of the invention is to provide a coupling means capable of either light or heavy work, and to that end the same possesses simplicity in construction, inexpensiveness in production and great strength in detail and arrangement of coöperating parts.

Preferably, the above stated coupling means comprises, in connection with the parts desired to be united or closed together, coöperating wedge members or surfaces capable of drawing the coupled members together, usually into impinging relation to seal the space therebetween by seating a packing interposed therebetween or effecting a machine-fit between opposing faces.

A convenient embodiment of the invention embraces a special contouring of the opposing beveled or wedge faces working to effectively draw the parts together, but tending to the greatest extent possible to prevent separation when the parts are forced home; also an improved combined forcing and locking means for exerting opposite pressures on the engaging beveled or wedge surfaces to cause them to ride over each other and correspondingly draw the parts to be coupled together, and for locking said surfaces against separation; also an improved interfitting relation of the male and female wedge parts whereby the latter although affording ample space for the introduction of the former will be reinforced by an integral wall entirely surrounding said space and of sufficient thickness to enable one of the inclined or beveled surfaces to be formed in the upper edge of one of the end walls to avoid the necessity of providing projecting lugs as well as avoiding the necessity of relatively weakening the entire structure by coupling the parts together through peripheral or lateral openings affording interfitting of the male and female members after the practice of the prior art.

All of the foregoing and important details in the formation and association of parts of the device made in accordance with the present invention will be readily understood from the more specific description hereinafter contained, when read in connection with the accompanying drawings, forming part hereof, and wherein several embodiments of the invention are illustrated.

In the drawings

Figs. 3 and 4 are corresponding views of another embodiment; and

Figs. 5 and 6 are similar views of a third embodiment of the invention.

Figure 1:
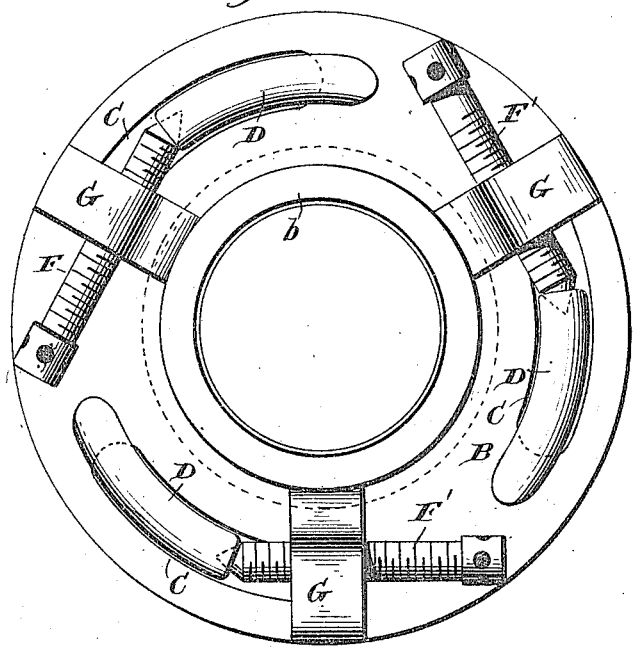
Figure 1 is an elevation of one type of the coupling.
Figure 2:
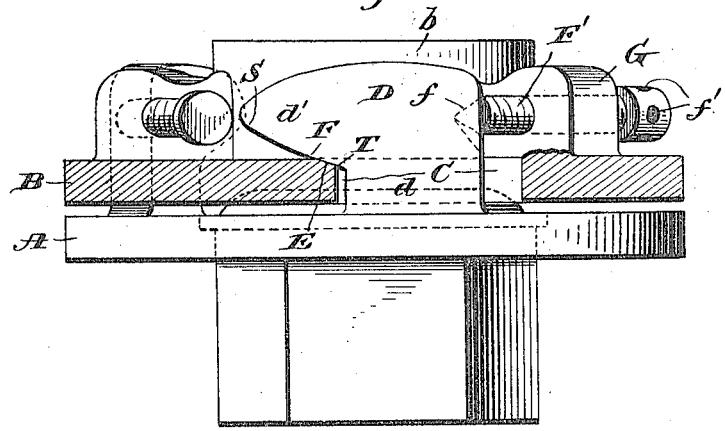
Fig. 2 is an edge view, parts being broken away looking at Fig. 1 from the left at an angle of about 45°.

Referring more specifically to the drawings wherein like reference letters refer to corresponding parts in the several views, and first relative to Figs. 1 and 2, A and B represent the members to be coupled together, the same in this instance being formed of metal and either fixedly attached to, as a part of, or loosely carried by pipe sections adapted to be coupled together to render the pipe sections continuous and prevent leakage therebetween.

The member B is provided with a series of elongated completely inclosed slots C, the inclosing of the slots being to provide an endless surrounding wall to strengthen the member at its recessed parts. The member A carries a series of fixed lugs D having a stem portion $d$ and nose portion $d'$, the latter projecting circumferentially or longitudinally of the part that carries the same, as the case may be. The member B is of substantial thickness to give the same adequate strength for its intended uses and also to enable the upper edge of one of the end walls of the slot C to be formed with a bearing edge, as at E, to oppose the rounded under engaging or wedge face F of the nose $d'$ adapted to ride over the bearing E to which I have just alluded. It is to be observed in this connection that the surface F, as distinguished from being a straight inclination, is formed on a curved line, the length of which, as described by the letters S and T, commences on an angle of approximately 30° at the outer point and terminates on an angle of approximately 5° or less at the extreme inner point. This brings the engaging surfaces, in their maximum clamping position as near to parallelism as practical, and it will be readily appreciated that such a relation will tend better to maintain the parts in wedged position than where a straight uniform angle of say 30° is maintained throughout the length of the nose or projecting portion $d'$ of the lug. The curving of the nose is exaggerated in the drawings to better show at a glance that the bearing or wedging surface is curved in lieu of being a straight inclination.

After the members A and B are brought together and the lugs D introduced through the slots C, the members may be relatively turned or reversely moved by hand to create the wedging action acting to draw the members A and B together, at least during the initial movement of these parts, but to get the forced or impinging action desired in many instances, I provide a mechanical means to create the necessary pressure. This means comprises a rotatable threaded bolt F′ carried by and in threaded engagement with a lug G preferably formed integral with the member B and with the collar $b$ on the member B so that the lug is firmly anchored and reinforced at its base and also at its inner end to give appropriate strength thereto as the bolt is actuated to bear upon the back of the lug D and force the said lug and member A in one direction, while correspondingly tending to draw the member B in a reverse direction. The end of the bolt F′ is tapered as at $f$ and bears upon an inclined socket formed in the rear edge of the lug D enabling the lug to ride upon the end of the bolt to the slight extent necessary when the members A and B approach each other, and also assisting in the wedging of the parts together. The threaded bolt F′ may be formed in any manner to facilitate the rotation thereof, but owing to its close location with reference to the member B, I preferably provide the head of the bolt with apertures $f'$ through which a tool may be passed to constitute a handle in turning the bolt following a common practice well known in the bolt art.

It will be understood that dependent upon conditions either one or more of the clamping bolts F′ may be employed in connection with the series of wedge lugs D.

In Figs. 3 and 4 where it may be assumed that the coupling means is specially designed for structures of larger size, it will be noted that in addition to the forcing and locking bolt here represented at H, I employ a supplemental wedge J flexibly connected as at K to the member L or associated part of the latter, this wedge being adapted to be hammered or otherwise forced between the back of the lug M and the opposing face of the bolt receiving lug N, the wedge J in this instance having a socket $j$ in its adjacent face for the reception of the end of the clamping bolt H.

The end of the wedge J is split or bifurcated as at $j'$ to provide a transverse slit $j^2$ for the reception of a prying implement O to be utilized when it is desired to eject the wedge J in order to release the parts. I have hereinbefore referred to couplings for pipes, but that specific art is merely illustrative of the application of my present invention to a useful purpose, and I have also referred to the fact that the engaging wedge members may either or both be fast or loosely associated with the members to be coupled. In Figs. 5 and 6, I have illustrated the members to be coupled, respectively designated P and Q, as of straight instead of curved or circular contour, with the wedge member B′ loosely mounted upon the member Q to be coupled, and the wedge members D′ as being carried by a separate part R and with the lugs projected through suitable slots C′ $p$ and $q$ in the members to be coupled, and in the wedge member B. In this instance I have shown both types of fastening means, that is the binding bolt F′ and binding bolt H′ in association with the separate wedge J′, the latter in this instance being removable detachably, that is, not fastened to be carried by the member B.

While I have herein referred to the specific embodiments of the invention, it will be understood that the said invention is capable of embodiment in still other forms and devices, all as will appeal to persons skilled in the art to which the invention appertains.

Having thus described the invention, what is claimed is:—

1. Coupling means of the character described comprising a member having a slotted portion with a bearing surface formed at one end of the same and extending into the slotted portion below the plane of the outer surface of said member, and a coöperating member carrying a lug adapted to pass through the slotted portion and having an elongated nose portion having an under wedging edge adapted to coöperate with the said bearing surface upon movement of one of the members relative to the other.

2. Coupling means of the character described comprising a member having a slotted portion with a wedging surface formed at one end of the same, and a coöperating member carrying a lug adapted to pass through the slotted portion, and having a nose portion adapted to coöperate with the said wedging surface upon movement of one of the members relative to the other, said nose portion having a wedging surface formed complemental to the formation of said first wedging surface, and the latter extending into the slotted portion below the plane of the outer surface of the member in which it is formed.

3. Coupling means of the character described comprising a member having a slotted portion with a wedging surface formed at one end of the same, and a coöperating member carrying a lug adapted to pass through the slotted portion and having a nose portion adapted to coöperate with the said wedging surface upon movement of one of the members relative to the other, said nose portion having a wedging surface formed on a curved line lengthwise thereof, substantially as and for the purpose described.

4. Coupling means of the character described comprising a member having a slotted portion with a wedging surface formed at one end of the same, and a coöperating member carrying a lug adapted to pass through the slotted portion and having a nose portion adapted to coöperate with the said wedging surface upon movement of one of the members relative to the other, said nose portion having a wedging surface formed on a curved line lengthwise thereof, and said first mentioned wedging surface being curved in a complemental manner substantially as and for the purpose described.

5. Coupling means of the character described comprising a member having a slotted portion with a wedging surface formed at one end of the same, a coöperating member carrying a lug adapted to pass through the slotted portion and having a nose portion adapted to coöperate with the said wedging surface upon movement of one of the members relative to the other, and means for effecting such movement comprising a forcing device engaging the back of the lug, and a lug extending over the face of the slotted member in which said forcing device is adjustably mounted.

6. Coupling means of the character described comprising a member having a slotted portion with a wedging surface formed at one end of the same, a coöperating member carrying a lug adapted to pass through the slotted portion and having a nose portion adapted to coöperate with the said wedging surface upon movement of one of the members relative to the other, and means for effecting such movement comprising a forcing device engaging the back of the lug, and a lug extending over the face of the slotted member in which said forcing device is adjustably mounted, said device including a bolt having threaded engagement with said lug.

7. Coupling means of the character described comprising a member having a slotted portion with a wedging surface formed at one end of the same, a coöperating member carrying a lug adapted to pass through the slotted portion and having a nose portion adapted to coöperate with the said wedging surface upon movement of one of the members relative to the other, and means for effecting such movement comprising a forcing device engaging the back of the lug, and a lug extending over the face of the slotted member in which said forcing device is adjustably mounted, said device including a bolt having threaded engagement with said lug, and the said first mentioned nosed lug having a recess in its back to receive the end of said bolt.

8. Coupling means of the character described comprising a member having a slotted portion with a wedging surface formed at one end of the same, a coöperating member carrying a lug adapted to pass through the slotted portion and having a nose portion adapted to coöperate with the said wedging surface upon movement of one of the members relative to the other, and means for effecting such movement comprising a forcing device engaging the back of the lug, and a lug extending over the face of the slotted member in which said forcing device is adjustably mounted, said device including a bolt having threaded engagement with said lug, and the said first mentioned nosed lug having a recess in its back to receive the end of said bolt, the recess having an inclined wall permitting movement of the two members together and coacting with the bolt to assist in the drawing of the members together.

9. Coupling means of the character described comprising a member having a slotted portion with a wedging surface formed at one end of the same, a coöperating member carrying a lug adapted to pass through the slotted portion and having a nose portion adapted to coöperate with the said wedging surface upon movement of one of the members relative to the other, and means for effecting said movement including a lug integral with the face of said first mentioned member and located on said face, and forcing means adjustably mounted in said lug.

10. Coupling means of the character described comprising a member having a slotted portion with a wedging surface formed at one end of the same, a coöperating member carrying a lug adapted to pass through the slotted portion and having a nose portion adapted to coöperate with the said wedging surface upon movement of one of the members relative to the other, and means adapted to be inserted facewise of said first mentioned member between the other end of the slotted portion and back of the lug for forcing the parts together.

11. Coupling means of the character described comprising a member having a slotted portion with a wedging surface formed at one end of the same, a coöperating member carrying a lug adapted to pass through the slotted portion and having a nose portion adapted to coöperate with the said wedging surface upon movement of one of the members relative to the other, and means adapted to be inserted facewise of said first mentioned member between the other end of the slotted portion and the back of the lug for forcing the parts together, said last mentioned means comprising a removable wedge, substantially as described.

12. Coupling means of the character described comprising a member having a slotted portion with a wedging surface formed at one end of the same, a coöperating member carrying a lug adapted to pass through the slotted portion and having a nose portion adapted to coöperate with the said wedging surface upon movement of one of the members relative to the other, and means adapted to be inserted facewise of said first mentioned member between the other end of the slotted portion and the back of the lug for forcing the parts together, said last mentioned means comprising a removable wedge, in combination with means for preventing accidental displacement of the wedge.

13. Coupling means of the character described comprising a member having a slotted portion with a wedging surface formed at one end of the same, a coöperating member carrying a lug adapted to pass through the slotted portion and having a nose portion adapted to coöperate with the said wedging surface upon movement of one of the members relative to the other, and means adapted to be inserted facewise of said first mentioned member between the other end of the slotted portion and the back of the lug for forcing the parts together, said last mentioned means comprising a removable wedge, in combination with means for preventing accidental displacement of the wedge, consisting of an adjustable bolt passing through said opposite end wall of the slot into impinging relation with said wedge.

14. Coupling means of the character described comprising a member having a slotted portion with a wedging surface formed at one end of the same, a coöperating member carrying a lug adapted to pass through the slotted portion and having a nose portion adapted to coöperate with the said wedging surface upon movement of one of the members relative to the other, and means adapted to be inserted facewise of said first mentioned member between the other end of the slotted portion and the back of the lug for forcing the parts together, said last mentioned means comprising a removable wedge, in combination with means for preventing accidental displacement of the wedge, consisting of an adjustable bolt passing through said opposite end wall of the slot into impinging relation with said wedge, said bolt being of a length to directly engage the back of the lug when the wedge is not used.

15. Coupling means of the character described comprising a member having a slotted portion with a wedging surface formed at one end of the same, a coöperating member carrying a lug adapted to pass through the slotted portion and having a nose portion adapted to coöperate with the said wedging surface upon movement of one of the members relative to the other, and means to be inserted facewise of said first mentioned member between the other end of the slotted portion and the back of the lug for forcing the parts together, said last mentioned means comprising a removable wedge, and means for securing the wedge to one of the members while permitting insertion and withdrawal of the same.

16. Coupling means of the character described comprising a member having a slotted portion with a wedging surface formed at one end of the same, a coöperating member carrying a lug adapted to pass through the slotted portion and having a nose portion adapted to coöperate with the said wedging surface upon movement of one of the members relative to the other, and means adapted to be inserted facewise of said first mentioned member between the other end of the slotted portion and the back of the lug for forcing the parts together, said last mentioned means comprising a removable wedge, the inner portion of the wedge being formed to receive a prying implement adapted to dislodge the same when the parts are to be uncoupled.

17. The combination with members to be coupled, having slotted portions adapted to be alined, coupling means of the character described comprising a member having a slotted portion with a wedge surface formed at one end of the same, a coöperating member carrying a lug adapted to pass through all of said slotted portions and having a nose portion adapted to coöperate with the said wedging surface upon movement of one of the coupling members relative to the other, both of said coupling members being loosely mounted for movement with reference to the said first mentioned members to be coupled.

18. The combination with members to be coupled, having slotted portions adapted to be alined, coupling means of the character described comprising a member having a slotted portion with a wedging surface formed at one end of the same, a coöperating member carrying a lug adapted to pass through all of said slotted portions and having a nose portion adapted to coöperate with the said wedging surface upon movement of one of the coupling members relative to the other, one of the coupling members being detachable with reference to the said first mentioned members to be coupled.

19. Coupling means of the character described comprising a member having a plurality of alined inclosed slotted portions each provided with a wedging surface formed at one end of the same, a coöperating member carrying a complemental plurality of lugs adapted to pass through the slotted portions and each having a nose portion adapted to coöperate with the adjacent wedging surface upon movement of one of the members relative to the other, and means for effecting said movement to forcibly engage each pair of wedging surfaces.

20. Coupling means of the character described comprising a member having a plurality of alined inclosed slotted portions each provided with a wedging surface formed at one end of the same, a coöperating member carrying a complemental plurality of lugs adapted to pass through the slotted portions and each having a nose portion adapted to coöperate with the adjacent wedging surface upon movement of one of the members relative to the other, and means for effecting said movement to forcibly engage each pair of wedging surfaces, said means including a forcing device mounted upon the face of one of the members and adapted to exert pressure behind one of the lugs, substantially as described.

21. Coupling means of the character described comprising a member having a plurality of alined inclosed slotted portions each provided with a wedging surface formed at one end of the same, a coöperating member carrying a complemental plurality of lugs adapted to pass through the slotted portions and each having a nose portion adapted to coöperate with the adjacent wedging surface upon movement of one of the members relative to the other, and means for effecting said movement to forcibly engage each pair of wedging surfaces, said means including a forcing device adapted to exert pressure behind one of the lugs, substantially as described.

In testimony whereof I hereunto affix my signature in the presence of two witnesses.

EDWARD F. BERRY.

Witnesses:
J. W. RODE,
THOS. CHESBRO WATKINS.

Copies of this patent may be obtained for five cents each, by addressing the "Commissioner of Patents, Washington, D. C."